United States Patent
Stanley et al.

[19]

[11] Patent Number: 6,158,782
[45] Date of Patent: Dec. 12, 2000

[54] PIPE COUPLING FLANGE ASSEMBLY

[75] Inventors: Terrence Edmond Stanley; Gary Paul Stanley, both of West Heidelberg, Australia

[73] Assignee: Shawley Investments Pty. Ltd., West Heidelberg, Australia

[21] Appl. No.: 09/230,660

[22] PCT Filed: Aug. 5, 1997

[86] PCT No.: PCT/AU97/00493

§ 371 Date: Jan. 29, 1999

§ 102(e) Date: Jan. 29, 1999

[87] PCT Pub. No.: WO98/06966

PCT Pub. Date: Feb. 19, 1998

[30] Foreign Application Priority Data

Aug. 13, 1996 [AU] Australia .............................. PO 1581

[51] Int. Cl.[7] .................................................. F16L 11/12
[52] U.S. Cl. ...................... 285/50; 285/148.23; 285/368; 285/915
[58] Field of Search .............................. 285/23, 110, 368, 285/412, 414, 915, 50, 148.23

[56] References Cited

U.S. PATENT DOCUMENTS

| 2,465,669 | 3/1949 | Tudor ........................................ 285/50 |
| 2,653,834 | 9/1953 | Purkhiser ................................... 285/50 |
| 4,116,474 | 9/1978 | Wolf ......................................... 285/110 |
| 4,991,876 | 2/1991 | Mulvey ................................ 285/915 X |

FOREIGN PATENT DOCUMENTS

| 2298/21 | 8/1922 | Australia . |
| 16457/56 | 9/1956 | Australia . |
| 11671/55 | 10/1956 | Australia . |
| 30115/77 | 5/1979 | Australia . |
| 45731/79 | 8/1979 | Australia . |
| 2 160 608 | 12/1985 | United Kingdom . |
| 2 167 511 | 5/1986 | United Kingdom . |

*Primary Examiner*—Dave W. Arola
*Attorney, Agent, or Firm*—Killworth, Gottman, Hagan & Schaeff, L.L.P.

[57] ABSTRACT

A flange assembly for a pipe coupling is disclosed which includes a flange body (12) which has an outer periphery (14) and an inner periphery (16) which defines a central opening (18). Holes (20) are arranged in the body (12). A rubber gasket (26) is adhered to one side of the flange body (12) and has an inner periphery which projects into the central opening (18) so that when a sleeve (56) of a coupling member (54) is inserted into the central opening (18), the rubber gasket (26) is deformed inwardly into the opening (18) and spaces the sleeve (54) from the flange body (12).

6 Claims, 1 Drawing Sheet

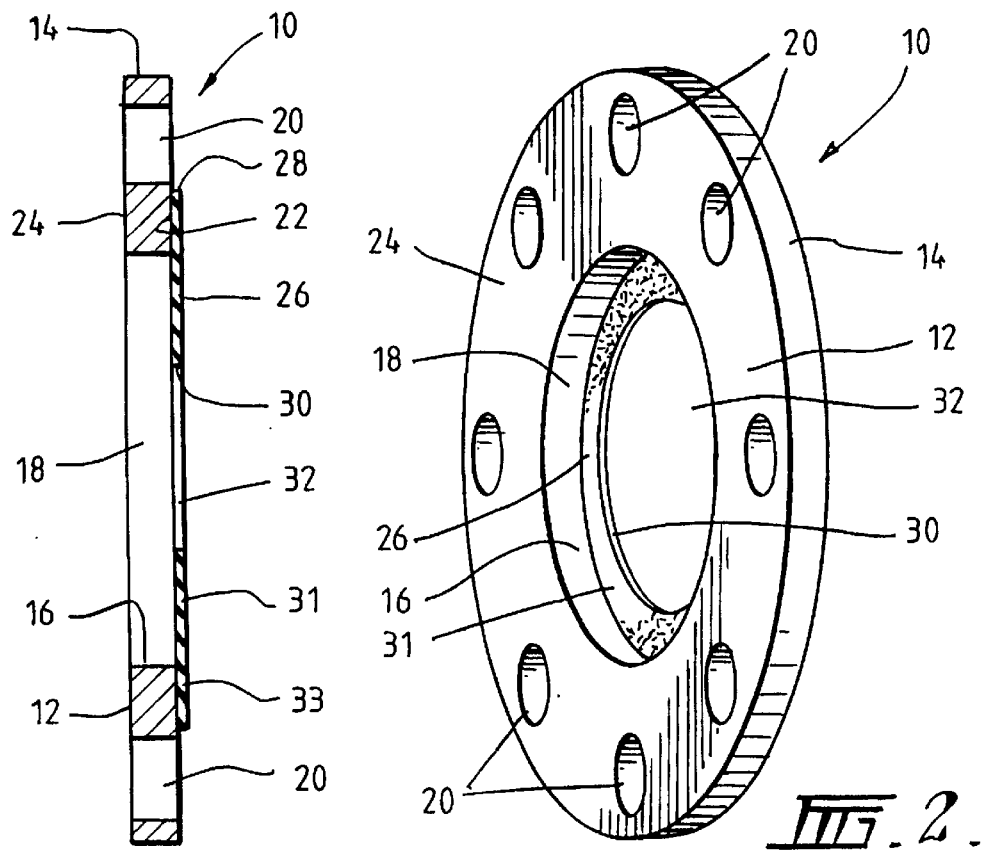
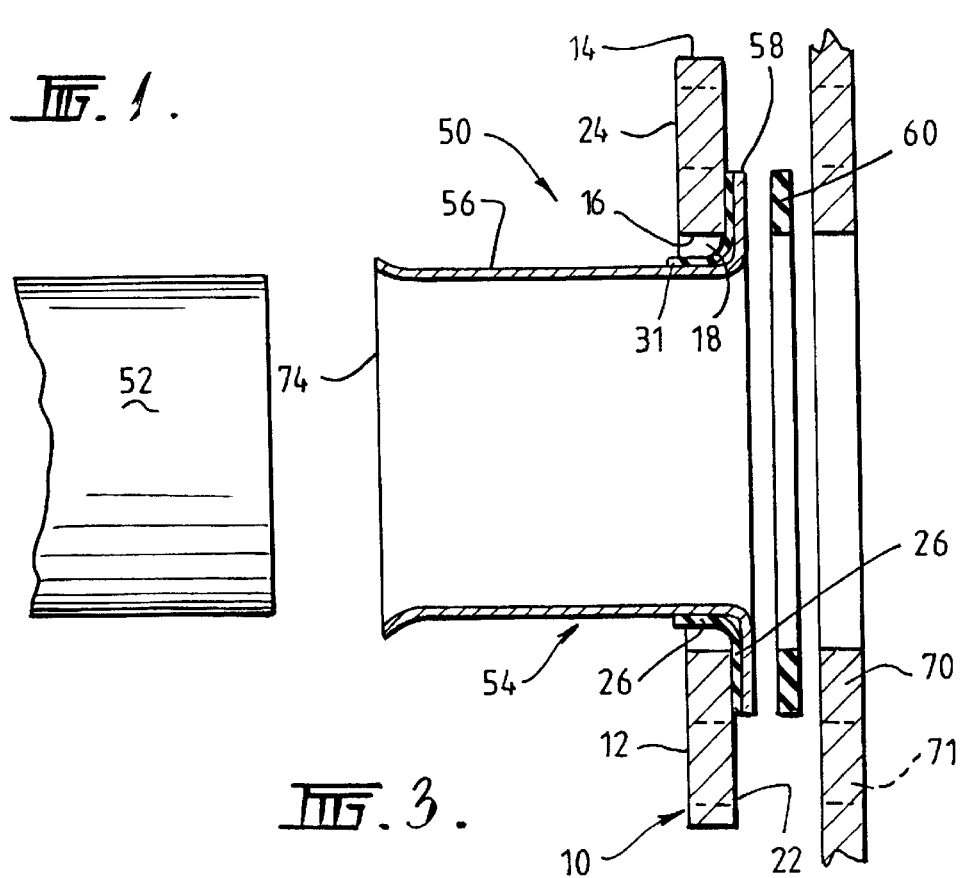

PIPE COUPLING FLANGE ASSEMBLY

This invention relates to a pipe coupling flange for a pipe coupling assembly.

Pipe coupling assemblies are known and generally comprise a flange which is annular in configuration having a central opening for receiving a pipe coupling. The pipe coupling has a sleeve section for receiving a pipe and a flange member which is formed integrally with the sleeve. The pipe coupling is located through the central opening of the flange with the flange member engaging on one side of the flange. The flange has a plurality of holes for receiving fasteners to secure the flange and therefore the pipe coupling to a fixed member.

In order to maintain costs as low as possible, it is conventional to form the flange from steel. If the steel flange is to be used with a copper pipe coupling, it is necessary to provide a protective coating on the flange so as to avoid the possibility of electrolysis which will damage and eventually deteriorate the pipe coupling and the flange. Normally the protective coating is provided by powder coating the flange.

The powder coating technique does suffer from some disadvantages. The first disadvantage is one of cost. The second disadvantage is that the powder coating can scratch to expose the metal from which the flange is formed and electrolysis can take place if scratching of the powder coating does occur.

The object of this invention is to provide a flange which overcomes these problems.

The invention may be said to reside in a flange assembly for a pipe coupling which has a sleeve section and an integral flange portion extending radially outwardly from the sleeve section at one end of the sleeve section, the flange assembly including:

a flange body having an outer periphery and an inner periphery defining a opening through the flange body, the flange body having a first side and a second opposite side;

a plurality of fastener holes in the flange body for securing the flange to a fixture; and a flexible gasket member having an outer periphery and an inner periphery defining an opening through the gasket member, the opening of the gasket member being smaller than the opening of the flange body and smaller than the outer diameter of said sleeve section, so that when the gasket member is located on the flange body, the inner periphery of the gasket member is located inwardly of the inner periphery of the flange body; and coupling means for coupling the gasket member to the first side of the flange body;

such that when the pipe coupling is located through the opening of the flange body and the opening of the gasket member, the flange portion of the coupling member abuts the gasket member so as to space the flange portion of the pipe coupling from the flange body and the inner periphery of the gasket portion is folded into the opening of the flange body so as to space the sleeve portion of the pipe coupling from the inner periphery of the flange body.

Since the flange assembly includes the gasket member which acts to space the pipe coupling from the flange body, it is not necessary to provide a protective coating on the flange assembly to avoid electrolysis. The spacing of the flange assembly from the pipe coupling by means of the gasket will serve to prevent electrolysis notwithstanding the fact that the flange assembly is not coated with a protective coating.

However, in other embodiments the flexible gasket member may be dimensioned such that the inner periphery of the gasket member is generally flush with the inner periphery of the flange body or projects slightly inwardly of the inner periphery of the flange body so as to space the pipe coupling from the flange body without the gasket being folded into the opening in the flange body.

In still other embodiments, the gasket member may be a generally rigid member having an L-shaped section in cross-section so that it basically takes permanently the profile of the folded gasket member with a portion of the gasket member being arranged adjacent the first side of the flange body and a transverse portion of the gasket member projecting into the opening through the flange body adjacent the inner periphery of the flange body.

Preferably the coupling means is adhesive and the gasket member is adhered to the first side of the flange body with the outer periphery of the gasket member being spaced inwardly of the fastening holes.

The invention may also be said to reside in a coupling assembly for a copper pipe, said coupling assembly including:

a coupling member having a sleeve section for receiving the pipe and an annular flange portion extending radially outwardly from the sleeve section;

a flange assembly including a flange body having an inner periphery and an outer periphery, the inner periphery defining an opening through the flange body for receiving the sleeve section of the coupling member, the flange body having a first side and a second side;

a plurality of fastener holes through the flange body;

a flexible gasket member having an outer periphery and an inner periphery defining an opening, the opening defined by the inner periphery of the gasket member being smaller than the opening defined by the inner periphery of the flange body and smaller than the outer diameter of said sleeve portion so that when the coupling member is located through the opening in the gasket member and the opening in the flange body, the flange portion abuts a portion of the gasket member to space the flange portion from the flange body and the inner peripheral portion of the gasket member is folded into the opening of the flange body so as to space the sleeve portion from the inner periphery of the flange body; and coupling means for coupling the gasket member to the first side of the flange body.

Preferably the coupling means is adhesive and the gasket member is adhered to the first side of the flange body.

Preferably the outer periphery of the gasket member is spaced inwardly of the fastening openings.

A preferred embodiment of the invention will be described, by way of example, with reference to the accompanying drawings, in which:

FIG. 1 is a cross-sectional view of a flange assembly according to the preferred embodiment of the invention;

FIG. 2 is a perspective view of the flange assembly of FIG. 1; and

FIG. 3 is a view of the flange assembly used in a coupling assembly.

With reference to FIGS. 1 and 2, a flange assembly 10 for a coupling assembly is shown which comprises a generally annular flange body 12 which has an outer periphery 14 and an inner periphery 16 which defines a central opening 18.

The flange body 12 has a plurality of fastener holes 20 for receiving bolts (not shown) to fasten the flange assembly to a fixture 71 (see FIG. 3).

The flange body also has a first side 22 and a second side 24. A rubber gasket 26 is adhered to the first side 22. The gasket 26 has an outer periphery 28 which is spaced inwardly towards the opening 18 with respect to the fastener openings 20 so as not to block or obstruct the fastener openings 20. The gasket member 26 also has an inner periphery 30 which defines an opening 32.

As is clearly seen in FIGS. 1 and 2, the inner periphery 30 of the gasket 26 is spaced inwardly into the opening 18 with respect to the inner periphery 16 of the flange body 12. Thus, the opening 32 defined by the gasket 26 is smaller than the opening 18 defined by the flange body 16.

Thus, the gasket 26 has an inner peripheral portion 31 which is that portion spaced inwardly of the inner periphery 16 of the flange body 12 and an outer peripheral portion 33 which is that part which overlies the first surface 22 outwardly of the inner periphery 16.

FIG. 3 shows a coupling assembly 50 according to the preferred embodiment of the invention for receiving a pipe 52. The coupling assembly 50 includes the flange assembly 10 described with reference to FIGS. 1 and 2 and a coupling member 54 which includes a sleeve section 56 and an outwardly extending flange portion 58. In order to assemble the coupling assembly, the sleeve 56 is inserted from the first side 22 of the flange 10 so that the sleeve 56 locates through the central openings 18 and 32. As the sleeve 56 passes through the openings 30 and 32, the inner periphery 30 of the gasket 26 and the portion of the gasket 26 spaced inwardly of the inner periphery 16 of the flange body 10 is folded inwardly into the opening 18 so that the inner peripheral portion 31 of the gasket 26 is sandwiched between the inner periphery 16 of the flange 10 and the sleeve member 56 and the remainder of the gasket 26 is sandwiched between the first surface 22 of the flange 10 and the flange portion 58 of the coupling member 54.

As will be evident from FIG. 3, the length of the inner peripheral portion 31 is preferably approximately the same as the thickness of the flange body 12 so that the entire inner periphery 16 of the flange body 12 is covered by the inner peripheral portion 31 of the gasket 26 when the pipe coupling 54 is located through the openings 18 and 32. Similarly, the remaining portion 33 of the gasket 26 outwardly of the inner periphery 16 is substantially of the same length as the flange 58 so that the portion 33 completely spaces the flange portion 58 from the first surface 22 of the flange body 12. However, the relative sizes of the inner peripheral portion 31 and outer peripheral portion 33 is not essential and the inner peripheral portion 31 could be less than the thickness of the flange body 12 and the portion 33 could extend only part of the length of the flange portion 58 so that the pipe coupling 54 is still spaced from the flange body 12.

Thus, the copper coupling member 54 is completely spaced from the flange body 12 and does not come into contact with the flange body 12 which will therefore prevent electrolysis from occurring between the copper pipe coupling 56 and the ferrous flange 10 without the need for the flange 10 to be powder coated or otherwise protectively coated to prevent electrolysis.

Although in FIG. 3 the diameter of the sleeve section 56 is only just less than the diameter of the opening 18, in some embodiments the diameter of the sleeve section 56 could be spaced a short distance from the inner periphery 16 of the flange body 12. The gasket 26 will function in the same manner described above to space the pipe coupling 54 from the flange body 12 and will also assist in centering and holding the pipe coupling 54 in the opening 18. Furtherstill, the spacing and holding of the pipe coupling will allow for expansion of the pipe coupling 54 in the opening 18.

If desired, an ancillary annular gasket 60 can be located between the flange portion 58 and a fixture 70 for sealing the coupling assembly 50 to the fixture 70 when bolts are passed through the fastening openings 20 and corresponding openings 71 on the fixture 70.

The sleeve 54 preferably has an outer opening 74 which may be swaged outwardly to accommodate the pipe 52. The swaging outwardly of the opening 74 also enables the pipe 52 to be inserted only a predetermined distance into the coupling member 54 so that the pipe 52 cannot pass completely through the coupling member 54 beyond the flange 10.

The invention therefore provides a flange assembly for a coupling member and a coupling assembly formed from the flange assembly and the coupling member which does not require a protective coating to be applied to the flange assembly thereby reducing the cost of the flange assembly.

Since modifications within the spirit and scope of the invention may readily be effected by persons skilled within the art, it is to be understood that this invention is not limited to the particular embodiments described by way of example hereinabove.

The claims defining the invention are as follows:

1. A flange assembly for a pipe coupling which has a sleeve section and an integral flange portion extending radially outwardly from the sleeve section at one end of the sleeve section, the flange assembly including:

a flange body having an outer periphery and an inner periphery defining an opening through the flange body, the flange body having a first side and a second opposite side;

a plurality of fastener holes in the flange body for securing the flange to a fixture;

a flexible gasket member having an outer periphery and an inner periphery defining an opening through the gasket member, the opening of the gasket member being smaller than the opening of the flange body and smaller than the outer diameter of said sleeve section, so that when the gasket member is located on the flange body, the inner periphery of the gasket member is located inwardly of the inner periphery of the flange body; and coupling means for coupling the gasket member to the first side of the flange body;

such that when the pipe coupling is located through the opening of the flange body and the opening of the gasket member, the flange portion of the coupling member abuts the gasket member so as to space the flange portion of the pipe coupling from the flange body and the inner periphery of the gasket portion is folded into the opening of the flange body so as to space the sleeve portion of the pipe coupling from the inner periphery of the flange body.

2. The assembly of claim 1, wherein the coupling means is adhesive and the gasket member is adhered to the first side of the flange body with the outer periphery of the gasket member being spaced inwardly of the fastening holes.

3. A coupling assembly for a copper pipe, said coupling assembly including:

a coupling member having a sleeve section for receiving the pipe and an annular flange portion extending radially outwardly from the sleeve section;

a flange assembly including a flange body having an inner periphery and an outer periphery, the inner periphery defining an opening through the flange body for receiving the sleeve section of the coupling member, the flange body having a first side and a second side;

a plurality of fastener holes through the flange body;

a flexible gasket member having an outer periphery and an inner periphery defining an opening, the opening defined by the inner periphery of the gasket member being smaller than the opening defined by the inner periphery of the flange body and smaller than the outer diameter of said sleeve section, so that when the coupling member is located through the opening in the gasket member and the opening in the flange body, the flange portion abuts a portion of the gasket member to space the flange portion from the flange body and the inner peripheral portion of the gasket member is folded into the opening of the flange body so as to space the sleeve portion from the inner periphery of the flange body; and coupling means for coupling the gasket member to the first side of the flange body.

4. The assembly of claim 3, wherein the coupling means is adhesive and the gasket member is adhered to the first side of the flange body.

5. The assembly of claim 3, wherein the gasket member is adhered to the first side of the flange body.

6. The assembly of claim 3, wherein the outer periphery of the gasket member is spaced inwardly of the fastening openings.

* * * * *